US010802966B2

United States Patent
Iyengar et al.

(10) Patent No.: US 10,802,966 B2
(45) Date of Patent: Oct. 13, 2020

(54) SIMULTANEOUS, NON-ATOMIC REQUEST PROCESSING WITHIN AN SMP ENVIRONMENT BROADCAST SCOPE FOR MULTIPLY-REQUESTED DATA ELEMENTS USING REAL-TIME PARALLELIZATION

(71) Applicant: International Business Machines Corporation, Armonk, NY (US)

(72) Inventors: Arun Iyengar, Fishkill, NY (US); Tim Bronson, Round Rock, TX (US); Michael Andrew Blake, Wappingers Falls, NY (US); Vesselina Papazova, Highland, NY (US); Arthur o'Neill, Poughkeepsie, NY (US); Jason D Kohl, Austin, TX (US); Kenneth Klapproth, Travis, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/275,436

(22) Filed: Feb. 14, 2019

(65) Prior Publication Data
US 2020/0264977 A1    Aug. 20, 2020

(51) Int. Cl.
*G06F 12/0806*    (2016.01)
*G06F 12/0817*    (2016.01)

(52) U.S. Cl.
CPC ...... *G06F 12/0806* (2013.01); *G06F 12/0828* (2013.01); *G06F 2212/621* (2013.01)

(58) Field of Classification Search
CPC ............ G06F 12/0811; G06F 12/0815; G06F 12/0833; G06F 9/467; G06F 12/0831; G06F 2212/621; G06F 12/0806; G06F 12/0828
See application file for complete search history.

(56) References Cited

U.S. PATENT DOCUMENTS 6,038,651  A     3/2000  VanHuben et al.
6,738,871  B2    5/2004  Van Huben et al.
(Continued)

OTHER PUBLICATIONS

D. J. Sorin, M. Plakal, A. E. Condon, M. D. Hill, M. M. K. Martin and D. A. Wood, "Specifying and verifying a broadcast and a multicast snooping cache coherence protocol," in IEEE Transactions on Parallel and Distributed Systems, vol. 13, No. 6, pp. 556-578. (Year: 2002).*

(Continued)

*Primary Examiner* — Baboucarr Faal
*Assistant Examiner* — Jane Wei
(74) *Attorney, Agent, or Firm* — Cantor Colburn LLP; William Kinnaman (57) ABSTRACT

Provided are systems, methods, and media for simultaneous, non-atomic request processing of snooped operations of a broadcast scope within a SMP system. An example method includes detecting, by a first controller, based on a set of coherency resolution conditions, whether there are coherency resolution problems between two snooped operations. The method includes in response to detecting, by the first controller, that coherency resolution problems will not result, transmitting, from the first controller to a second controller, an indication signal indicating that coherency resolution problems will not result from the operation. The set of coherency resolution conditions includes: (a) detecting that a second operation of the two snooped operations operation is of a predetermined type, (b) detecting at time of snooping of the second operation that a directory state does not allow for exclusive data, and (c) detecting that the first controller has started committing to an update.

20 Claims, 4 Drawing Sheets

(56) References Cited

U.S. PATENT DOCUMENTS

| | | | |
|---|---|---|---|
| 6,738,872 B2 | 5/2004 | Van Huben et al. | |
| 7,085,897 B2 | 8/2006 | Blake et al. | |
| 7,111,130 B2 | 9/2006 | Blake et al. | |
| 8,762,651 B2 | 6/2014 | Blake et al. | |
| 8,918,587 B2 | 12/2014 | Bronson et al. | |
| 9,081,501 B2 | 7/2015 | Asaad et al. | |
| 9,858,074 B2 | 1/2018 | Bradbury et al. | |
| 10,095,543 B1 | 10/2018 | Griffin et al. | |
| 2009/0177845 A1* | 7/2009 | Moyer | G06F 12/0831 711/146 |
| 2014/0112339 A1* | 4/2014 | Safranek | G06F 13/4291 370/389 |
| 2015/0052308 A1* | 2/2015 | Ray | G06F 9/528 711/125 |
| 2018/0365151 A1* | 12/2018 | Zoellin | G06F 12/0822 |

OTHER PUBLICATIONS

Aldinucci; "Dynamic shared data in structured parallel programming frameworks"; Universitàdi Pisa Dipartimento di Informatica—Ph.D. Thesis: TD-09/03 (2017); 224 pages.

IBM; "Method and Apparatus for Cooperative State Prefetching in Clustered Shared Memory Multiprocessor Systems with Region Coherence Arrays"; ip.com—IPCOM000180817D; Mar. 17, 2009; 7 pages.

IBM; "Method for Management of Protection and Address Translation Caches"; ip.com—IPCOM000124844D; May 10, 2005; 3 pages.

Sorin et al.; "Specifying and Verifying a Broadcast and a Multicast Snooping Cache Coherence Protocol"; Copyright 2002 IEEE—Reprinted from IEEE Transactions on Parallel and Distributed Systems, vol. 13, Issue 6, Jun. 2002, pp. 556-578 (25 pages).

Iyengar et al.; "Efficient Remote Resource Allocation Within an SMP Broadcast Scope Maintaining Fairness Between Operation Types"; U.S. Appl. No. 16/285,328, filed Feb. 26, 2019.

List of IBM Patents or Patent Applications Treated As Related; Date Filed: Feb. 26, 2019, 2 pages.

* cited by examiner

SIMULTANEOUS, NON-ATOMIC REQUEST PROCESSING WITHIN AN SMP ENVIRONMENT BROADCAST SCOPE FOR MULTIPLY-REQUESTED DATA ELEMENTS USING REAL-TIME PARALLELIZATION

BACKGROUND

The present invention generally relates to processing within a multi-level computing environment, and more specifically, to simultaneous, non-atomic request processing within a symmetric multiprocessor (SMP) environment.

A cache is generally a memory that stores copies of data from the most frequently used system memory locations such that future requests for data may be served faster. A multiprocessor computing system includes multiple processing units that are coupled to one another and share a system memory. In order to reduce access latency to data and instructions residing in the system memory, each processing unit may be supplied with a multi-level cache hierarchy. For example, a level one (L1) cache may have a lower access latency than a level two (L2) cache, the L2 cache may have a lower access latency than a level three (L3) cache, and the L3 cache may have a lower access latency than a level four (L4) cache. Cache operations in a multilevel cache hierarchy are controlled by a cache controller. Each level of the cache has an associated directory to keep track of which lines of the cache are stored in the specific cache.

SUMMARY

Embodiments of the present invention provide a computer-implemented method for simultaneous, non-atomic request processing of snooped operations in a broadcast scope within a SMP system. A non-limiting example of the computer-implemented method includes detecting, by a first controller of the SMP system, based on a set of coherency resolution conditions, whether there are coherency resolution problems between two snooped operations arriving from multiple chips on the broadcast scope requesting access to a data element. The method includes in response to detecting, by the first controller, that coherency resolution problems will not result, transmitting, from the first controller to a second controller of the SMP system, an indication signal indicating that coherency resolution problems will not result from the operation. A non-limiting example set of coherency resolution conditions includes: (a) detecting that a second operation of the two snooped operations operation is of a predetermined type, (b) detecting at time of snooping of the second operation that a directory state does not allow for exclusive data, and (c) detecting that the first controller has started committing to an update. The second controller is configured to receive the indication signal and to allow ingating of the second operation of the two or more snooped operations into a central pipeline based, at least in part on, the received indication signal.

Embodiments of the present invention provide a system for simultaneous, non-atomic request processing of snooped operations of a broadcast scope within a SMP environment. A non-limiting example of the system includes one or more processors configured to perform a method. A non-limiting example of the method includes detecting, by a first controller of the SMP environment, based on a set of coherency resolution conditions, whether there are coherency resolution problems between two snooped operations arriving from multiple chips on the broadcast scope requesting access to a data element. The method includes in response to detecting, by the first controller, that coherency resolution problems will not result, transmitting, from the first controller to a second controller of the SMP environment, an indication signal indicating that coherency resolution problems will not result from the operation. A non-limiting example set of coherency resolution conditions includes: (a) detecting that a second operation of the two snooped operations operation is of a predetermined type, (b) detecting at time of snooping of the second operation that a directory state does not allow for exclusive data, and (c) detecting that the first controller has started committing to an update. The second controller is configured to receive the indication signal and to allow ingating of the second operation of the two or more snooped operations into a central pipeline based, at least in part on, the received indication signal.

Embodiments of the invention provide a computer program product for simultaneous, non-atomic request processing of snooped operations of a broadcast scope within a SMP system, the computer program product comprising a computer readable storage medium having program instructions embodied therewith. The program instructions are executable by a system comprising one or more processors to cause the system to perform a method. A non-limiting example of the method includes detecting, by a first controller of the SMP system, based on a set of coherency resolution conditions, whether there are coherency resolution problems between two snooped operations arriving from multiple chips on the broadcast scope requesting access to a data element. The method includes in response to detecting, by the first controller, that coherency resolution problems will not result, transmitting, from the first controller to a second controller of the SMP system, an indication signal indicating that coherency resolution problems will not result from the operation. A non-limiting example set of coherency resolution conditions includes: (a) detecting that a second operation of the two snooped operations operation is of a predetermined type, (b) detecting at time of snooping of the second operation that a directory state does not allow for exclusive data, and (c) detecting that the first controller has started committing to an update. The second controller is configured to receive the indication signal and to allow ingating of the second operation of the two or more snooped operations into a central pipeline based, at least in part on, the received indication signal.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as noted above, a cache is generally a memory that stores copies of data from the most frequently used system memory locations such that future requests for data may be served faster. A SMP computing system includes multiple processing units that are coupled to one another, and share a system memory. In order to reduce access latency to data and instructions residing in the system memory, each processing unit may be supplied with a multi-level cache hierarchy. For example, a level one (L1) cache may have a lower access latency than a level two (L2) cache, the L2 cache may have a lower access latency than a level three (L3) cache, and the L3 cache may have a lower access latency than a level four (L4) cache. Cache operations in a multilevel cache hierarchy are controlled by a cache controller. Within a cache, data are organized and tracked on a cache line basis. Each level of the cache has an associated directory to keep track of which lines of the cache are stored in the specific cache.

Conflicting data requests from multiple SMP agents within an SMP broadcast scope typically must be serialized to ensure data integrity and cache coherency (e.g., accessing a line to write a value to memory). In prior approaches, if multiple agents within a broadcast scope want to obtain access of same data element from a third agent within the scope (e.g., requesting for the same address), exclusive access is not granted to multiple requesting agents simultaneously. A fixed serialization order would have been selected to ensure that the location of the entity containing the most recent data value is maintained, and that subsequent requests for the same data are serviced from one or more of the aforementioned entities.

Depending on the nature of the requests from the SMP agents and/or the current state or condition of the data element within the SMP broadcast scope, it is possible to minimize the amount of atomicity and serialization required for request processing. For example, if a line is in a read-only (RO) state and if it is known that there is no risk or low risk of the value changing, then access need not be serialized. In one example, if there is a lock value for a stored piece of data (e.g., a lock) and if multiple entities wish to see this data but only one can write to the lock, then the access would be serialized. Reading the lock however need not be serialized. This behavior is referred to herein as RO line sharing.

Turning now to an overview of the aspects of the invention, one or more embodiments of the invention address the above-described shortcomings of the prior art by providing a method in which operations from SMP agents within a broadcast scope issue a scope-wide lookup for a data element. The entity which will ultimately source the data element for the operation either rejects the request or agrees to fulfill the operation via a resource. If the data sourcing entity decides to agree to perform this operation, subsequent operations are denied or blocked based on information provided by the resource currently active. For example, a controller such as an L4 shared cache controller, monitors an L4 pipeline for additional requests from the same SMP broadcast scope. When it observes an additional request to the same data element as a previous request, the L4 shared cache controller looks at the current cache state of the line, as well as the state of the conflicting controller from the previous request. If it is determined, based on this information, that the superimposition of these two requests will not result in a coherency violation, then the L4 shared cache controller may allow another resource to activate and fulfill the request simultaneously. Directory coherency is maintained via the observation of the central pipe for changes in the state, allowing for non-atomic updates by either resource in any suitable order. In some embodiments of the present invention, the directory coherency is maintained based, at least in part, on a cache directory state protocol such as, for example, MESI protocol. If it is determined, based on the real-time information available at the snoop of the second request, that the superimposition of these two operations might result in a coherency violation, a rejection of the request may still be preventable if coherency can be resolved cleanly by establishing a deterministic order between the two requests. If such a situation arises, the second operation can be temporarily placed in an ordering coupling with the first operation which ensures a deterministic order of completion without rejection.

The above-described aspects of the invention address the shortcomings of the prior art by a method that reduces the latency of data return to multiple SMP agents within a single SMP broadcast scope by detecting, in real-time, when the state of the system and nature of the requests allow such sharing of access to data element without compromise to the integrity or coherency of the broadcast scope. In some embodiments of the present invention, when this detection and sharing mechanism is applied to read-only type operations, a completion time savings of ~20% or greater can be achieved.

Figure 1:
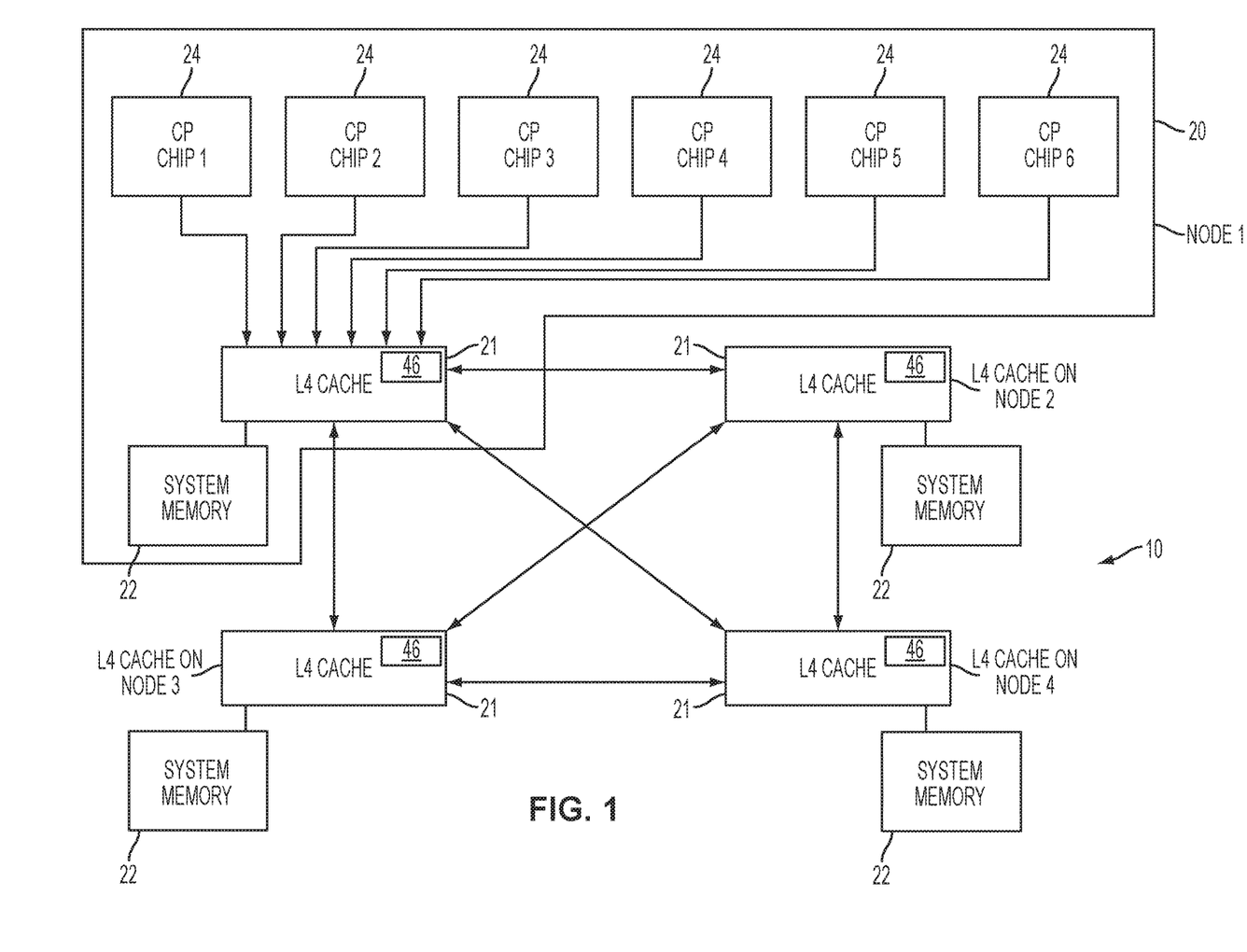
FIG. 1 depicts an example SMP computer system capable of implementing one or more embodiments of the present invention.

Turning now to a more detailed description of aspects of the present invention, FIG. 1 illustrates an example of a SMP computing system 10 that can be utilized to perform one or more embodiments of the present invention. The computing system 10 includes a plurality of nodes 20 that are each in communication with one another. Each node 20 includes a portion of system memory 22 which is in communication with the L4 cache 21 on that node 20. As shown in FIG. 1, in some embodiments of the present invention, the computing system 10 includes four nodes 20, however it is understood that any number of multiple nodes may be used as well. Specifically, FIG. 1 illustrates a Node 1, Node 2, Node 3, and Node 4. Each node is in communication with one or more central processing (CP) chips 24. For example, in some embodiments of the present invention, each node 20 is in communication with six CP chips 24 (FIG. 1 illustrates only Node 1 in communication with six CP chips 24 for purposes of clarity).

Figure 2:
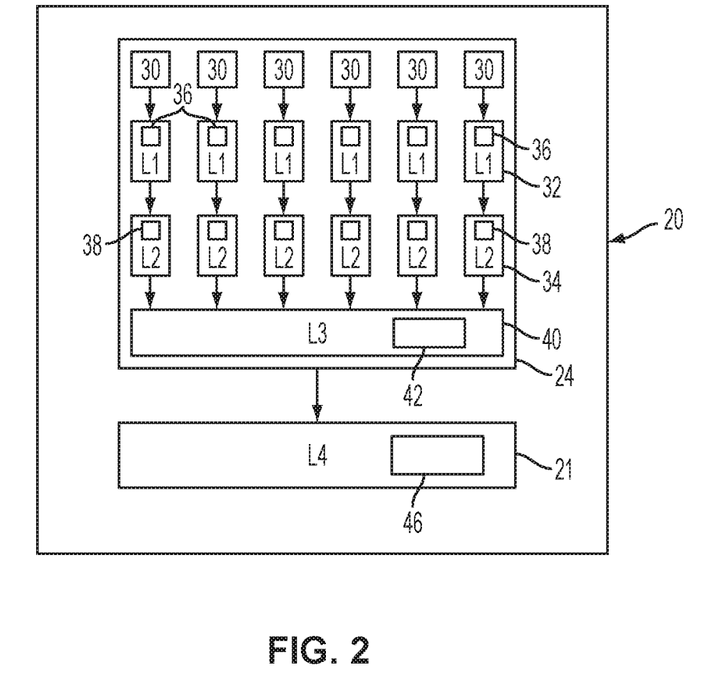
FIG. 2 depicts an example central processing (CP) chip of the SMP computer system of FIG. 1 in accordance with one or more embodiments of the present invention.

Referring now to FIGS. 1-2, each CP chip 24 includes one or more cores 30 for the reading and executing of instructions. As shown in the example of FIG. 2, in some embodiments of the present invention, each CP chip 24 includes six cores 30, however it is understood that any number of cores 30 may be used as well. Referring to FIG. 2, in some embodiments of the present invention, each core 30 is operatively coupled to a level one (L1) cache 32 and a level two (L2) cache 34. The L1 caches 32 are coupled to the cores 30, and the L2 caches 34 are coupled to the L1 caches 32. The L1 cache 32 includes an L1 controller 36, and the L2 cache 34 includes an L2 controller 38. Each L2 cache 34 is coupled to a level three (L3) cache 40, where one L3 cache 40 is included in each CP chip 24. Each L3 cache 40 is shared by multiple L2 caches 34. For example, as shown in FIG. 2, in some embodiments of the present invention, the L3 cache 40 is shared by six L2 caches 34. The L3 cache 40 also includes an L3 controller 42. The (L4) cache 21 is shared by one or more L3 caches 40. Each L4 cache 21 includes an L4 cache controller 46. In the example shown in FIG. 2, the node 20 (e.g., Node 1, Node 2, Node 3, and Node 4 shown in FIG. 1) includes six L3 caches 40 which are in communication with the L4 cache 21 on the node. It is also understood that although FIGS. 1-2 illustrate a multi-level cache hierarchy having four levels of cache, it is understood that the computing system 10 may include various other suitable number of levels of cache. It is also understood that while FIGS. 1-2 illustrate the highest level cache on nodes 20 as L4 caches, the highest level cache on nodes 20 may be a lower level of cache (e.g., a L3 cache) or a higher level of cache as well.

In some embodiments of the present invention, when one or more of the cores 30 located on a certain node 20 (e.g., Node 1, Node 2, Node 3, and Node 4) request data for a potential update, the cache located in the node 20 (e.g., the L1 cache 32, the L2 cache 34, the L3 cache 40 and the L4 cache 21) receives a request for information. For example, with reference to FIG. 1, in some embodiments of the present invention, the cores 30 (shown in FIG. 2) of the CP chip 1 of Node 1 may request data for a potential update. If the data requested is contained in any of the L1 cache 32, the L2 cache 34, the L3 cache 40, and the L4 cache 21 of Node 1 (which is referred to as a cache hit), the request may be served. However, in the event the data that was requested is not contained in any of the L1 cache 32, the L2 cache 34, the L3 cache 40, and the L4 cache 21 of Node 1, this is referred to as a cache miss. In some embodiments of the present invention, in the event that a cache miss occurs, an exclusive fetch for the missing data is sent to the remaining or remote nodes 20 (e.g., Node 2, Node 3, and Node 4) as well as the system memory 22.

In some embodiments of the present invention, the L4 cache 21 includes a cache memory (e.g., a cache memory array) and a corresponding cache directory (e.g., a cache directory array). In some embodiments of the present invention, the cache directory includes a plurality of directory entries that correspond to one of a plurality of cache lines of the cache memory. Accordingly, when operating in default behavior, in some embodiments of the present invention, in the event of a cache miss occurring, an exclusive fetch is sent to the remaining or remote nodes to obtain the specific cache line and to invalidate any copies of the line that may exist in the L4 caches 21 (and all lower level caches) on those remote nodes 20. For example, in some embodiments of the present invention, if one of the cores 30 of Node 1 (i.e., a local node) requests the specific cache line 64. The L1 cache 32, the L2 cache 34, the L3 cache 40, and Node 1 receive a request for the specific cache line 64. In the event that the specific cache line 64 is not found and a cache miss occurs, in some embodiments of the present invention, the L4 cache controller 46 initiates an exclusive fetch to each of Node 2, Node 3, and Node 4 (i.e., remote nodes) on behalf of the requesting core 30.

In some embodiments of the present invention, a cache directory state table is utilized to set, among other things, ownership tags for a node (e.g., remote node) that has the particular state set. For each cache line in the remote node there is a corresponding ownership tag. An intervention master (IM) tag applies to only one copy if the data is held in multiple caches. The IM tag identifies which one of the multiple copies will respond to a request by another cache for a copy of data. A MC tag designates multiple copies, and designates that multiple copies of the data may exist in different caches. This is possible if the data is in a read-only state as opposed to an exclusive state. An EX tag is an exclusive bit and designates that the data is held in an exclusive state (e.g., held in exclusive state by a core 30 of FIG. 2). Other suitable types of tags may be included in one or more embodiments of the present invention.

In some embodiments of the present invention, local read-only and/or conditional-exclusive type operations for access to a data element are managed by a controller in Level 4 (L4) such as for example, a local controller (e.g., CFAR, LFAR, etc.). For example, in some embodiments of the present invention, a local controller of a node provides information to a central L4 shared cache controller pipeline to determine a result of subsequent requests for the same data element. The local controller is configured to send a signal to the L4 shared cache controller indicating whether the local controller is handling requests for which data can be shared without loss of coherency maintenance. The value of the indication signal that is provided by the local controller can change in real-time in response to changes in the state of the system external to the SMP broadcast scope (e.g., other node). In some embodiments of the present invention, this signal is stored as a value in a cache directory state.

The indication signals are received by the central L4 shared cache controller. The central L4 shared cache controller is configured to modify default reject and/or accept behavior of subsequent operations in response to the received indication signals. By modifying the default reject and/or accept behavior, the central L4 shared cache controller allows for simultaneous processing to be achieved.

Consider a scenario where the system is configured to handle coherency resolution for two local conditional-exclusive fetches that are received from multiple chips (e.g., SMP agents) on a same node (e.g., same SMP broadcast scope). Conditional-exclusive fetches (CEX) can return read-only or exclusive data depending on the state of the directory at the time the operation is to be performed. If exclusive data is provided, the location of the entity containing the most recent data value may be subject to change. A subsequent request for the same data may observe a varying data sourcing entity depending on the nature of the overlap between the two operations. Thus, in some embodiments of the present invention, any subsequent conditional exclusive or read-only (RO) fetches from other CP Chips 24 attached to the L4 Cache 21 are rejected if an indication of processing is given to a prior conflicting operation.

In some embodiments of the present invention, a subsequent operation may be rejected upon detecting that, external to either of the two operations, a particular case of overlap between the two operations will not result in any coherency resolution problems. For example, in some embodiments of the present invention, one such instance occurs when the copy of the line in the L4 is in the non-IM state.

A real-time detection process is performed that detects whether there is overlap between two snooped operations that will not result in any coherency resolution problems. If it is detected that coherency resolution problems will not result, then a signal indication is issued (e.g., RO Pending signal) that indicates that coherency resolution problems will not result from the operation. In the context of the present example scenario, an indication signal is transmitted from the CFAR to the central L4 shared cache controller in response to detecting a certain set of coherency conditions. For example, in some embodiments of the present invention, the CFAR is configured to initially assert an indication signal in response to the following set of coherency resolution conditions occurring: (a) that the operation being snooped is of a certain predetermined type (e.g., RO type or CEX type); (b) that the directory state at the time of the snoop does not allow for exclusive data (e.g., due to the non-IM state); and (c) that the controller has started committing to the update (e.g., Regular Pending signal). In some embodiments of the present invention, if the set of conditions are not met at the time the snoop is conducted, the indication signal may be transmitted at a later time upon the CFAR internally or externally observing the set of coherency resolution conditions are satisfied after the snoop.

As noted above, the indication signal is taken into account by the central L4 shared cache controller to modify the default reject/accept behavior of subsequent operations. Without this indication, any subsequent CEX operation on the bus broadcast scope would have been rejected until the first operation finished. However, with this indication, an additional CEX fetch from a different chip on the bus can be serviced simultaneously. A subsequent CEX fetch operation, which normally would be rejected, is now able to be completed because of the real-time indication that additional operations of this type are allowed. When the subsequent operation is snooped, it is determined (1) whether this new operation meets the coherency resolution requirements, and (2) whether any conflicts detected have the status set indicating that overlap with the new operation is allowed. Since both of these tests pass, the second CEX fetch is processed simultaneously without rejection thus allowing parallelism of the two operations to be achieved.

Figure 3:
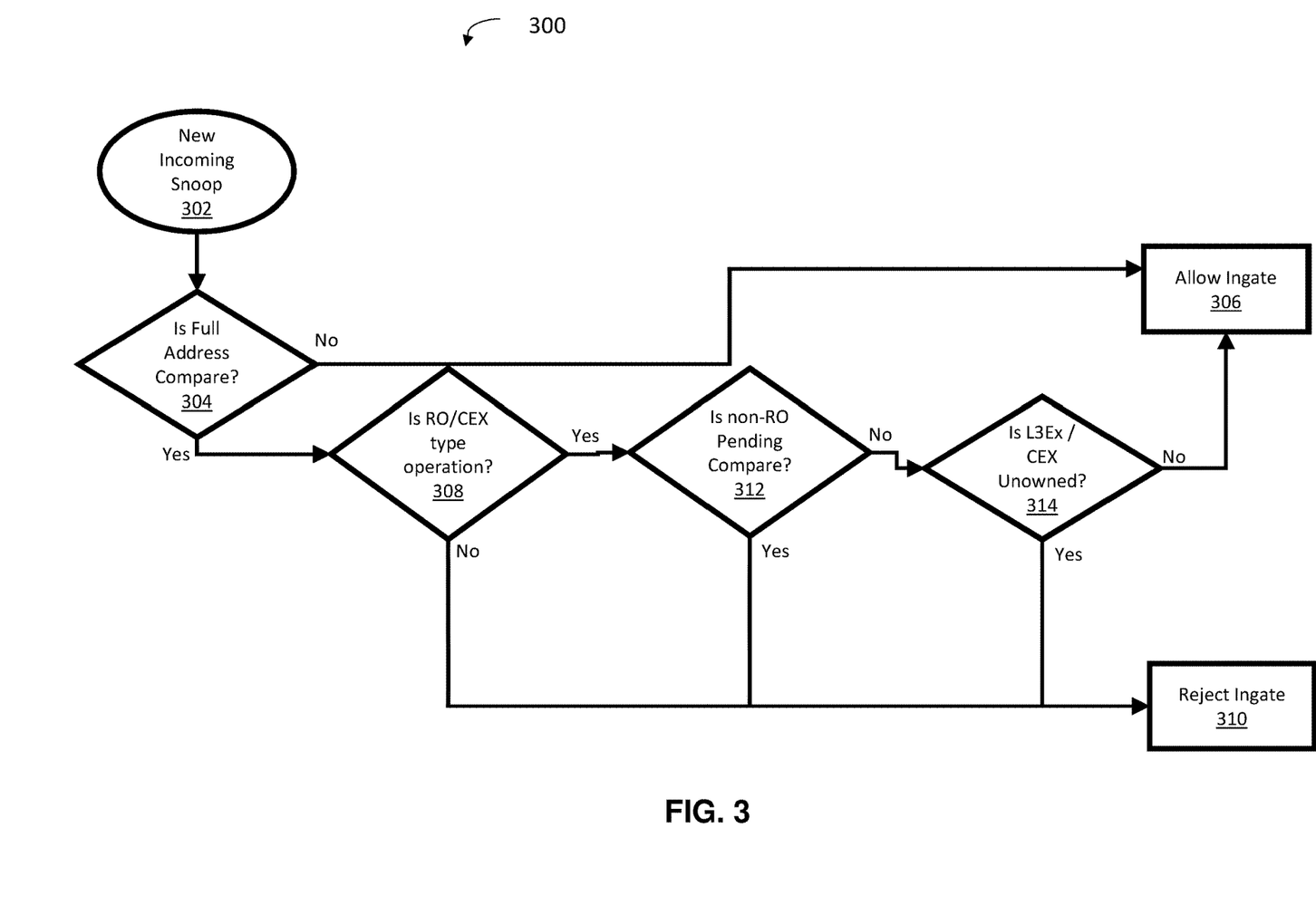
FIG. 3 depicts a flow diagram illustrating example in-gate behavior logic that in accordance with one or more embodiments of the present invention.

FIG. 3 illustrates example in-gate behavior logic 300 that can performed in accordance with one or more embodiments of the present invention. At block 302, an incoming snoop is received for a subsequent operation. At block 304 a full address compare is performed. If at block 304 it is determined that the full address requested is not the same, then ingating of the operation is allowed at block 306. If however at block 304 it is determined that the full address compare is the same and/or substantially overlaps, at block 308 it is then determined whether the snooped operation is a RO or CEX type operation. If it is determined at block 308, the operation is not a RO or CEX type operation, the ingating of the operation is rejected at block 310. If however if it is determined at block 308, that the operation is a RO or CEX type operation, then at block 312 is determined whether there is an non-RO pending signal compare. If it is determined at block 312 that there is a non-RO pending signal compare, then ingating of the operation is rejected at block 310. If however it is determined at block 312 that there is not a non-RO pending signal compare, then it is determined whether there is a aparticular directory state. For example, if however it is determined at block 312 that there is not a non-RO pending signal compare, then it is determined at block 314 whether there is a L3EX/CEX unowned. If at block 314 it is determined that L3Ex/CEX is unowned, then ingating of the operation is rejection at block 310. If however at block 314 it is determined that L3EX/CEX is owned, then ingating of the operation is allowed at block 306. Other suitable variations may be utilized to detect conditions in real-time, which may depend on operation type. Other types of directory encoding states may be considered in accordance with one or more embodiments of the present invention. For example, if directory state indicates the state GIM1 GMC0 Unowned, then a RO fetch may return RO data, whereas a CEX fetch might return Exclusive data. As such, in some embodiments of the present invention, an additional reject condition for a CEX fetche may occur even when the directory state is non-exclusive.

Figure 4:
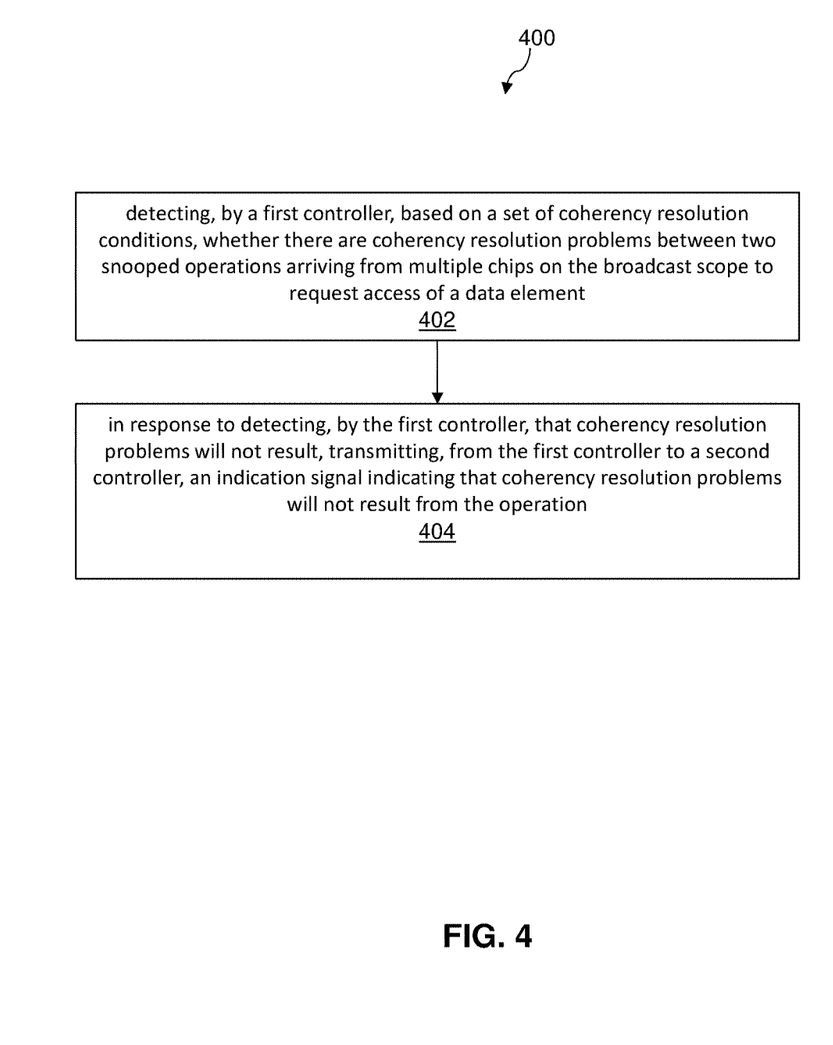
FIG. 4 depicts a flow diagram illustrating an example methodology in accordance with one or more embodiments of the present invention.

Additional details of the operation of a SMP computing system 10 will now be described with reference to FIG. 4, wherein FIG. 4 depicts a flow diagram illustrating a methodology 400 for simultaneous, non-atomic request processing of snooped operations of a broadcast scope within a SMP system according to one or more embodiments of the present invention. At block 402, a first controller of the SMP system detects, based on a set of coherency resolution conditions, whether there are coherency resolution problems between two snooped operations arriving from multiple chips on the broadcast scope requesting access to a data element. At block 404, the first controller transmits an indication signal to a second controller of the SMP system, the signal indicating that coherency resolution problems will not result from the operation. The second controller receives the indication signal and then accepts and/or rejects ingating of a second operation of the two or more snooped operations into a central pipeline based, at least in part on, the received indication signal. The set of coherency resolution conditions includes: (a) detecting that the second operation of the two snooped operations operation is of a predetermined type, (b) detecting at time of snooping of the second operation that a directory state does not allow for exclusive data, and (c) detecting that the first controller has started committing to an update. In some embodiments of the present invention, predetermined type comprises RO type or CEX type.

In some embodiments of the present invention, the second controller is configured to receive the indication signal and to allow ingating of a second operation of the two or more snooped operations into a central pipeline based, at least in part on, the received indication signal. In some embodiments of the present invention, the directory state is stored in a cache state directory. In some embodiments of the present invention, the detecting that the second operation does not allow for exclusive data is based, at least in part, on detecting a non-IM state in the cache state directory.

In some embodiments of the present invention, the first controller is a core fetch access register (CFAR) and/or a local fetch access register (LFAR). In some embodiments of the present invention, the second controller is a L4 shared cache controller. In some embodiments of the present invention, the central pipeline is an L4 pipeline. In some embodiments of the present invention, the central L4 shared cache controller is configured to monitor the L4 pipeline.

In some embodiments of the present invention, the two snooped operations comprise two local conditional-exclusive fetches arriving from the multiple chips on the broadcast scope. In some embodiments of the present invention, the central L4 shared cache controller is configured to reject ingating of the second snooped operation into the L4 pipeline if the indication signal is not received by the central L4 shared cache controller.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for simultaneous, non-atomic request processing of snooped operations of a broadcast scope within a symmetric multiprocessor (SMP) system, the method comprising:

detecting, by a first controller of the SMP system, based on a set of coherency resolution conditions, whether there are coherency resolution problems between two snooped operations arriving from multiple chips on the broadcast scope requesting access to a data element; and in response to detecting, by the first controller, that coherency resolution problems will not result, transmitting, from the first controller to a second controller of the SMP system, an indication signal indicating that coherency resolution problems will not result from the two snooped operations;

wherein the second controller is configured to receive the indication signal and to allow ingating of a second operation of the two or more snooped operations into a central pipeline based, at least in part on, the received indication signal;

wherein the set of coherency resolution conditions includes: (a) detecting that the second operation of the two snooped operations is of a predetermined type, (b) detecting at time of snooping of the second operation that a directory state does not allow for exclusive data, and (c) detecting that the first controller has started committing to an update.

2. The computer-implemented method of claim 1, wherein the first controller comprises a core fetch access register (CFAR) controller.

3. The computer-implemented method of claim 1, wherein the second controller comprises a central level 4 (L4) shared cache controller, wherein the central pipeline comprises an L4 pipeline, wherein the central L4 shared cache controller is further configured to monitor the L4 pipeline.

4. The computer-implemented method of claim 3, wherein the predetermined type comprises read-only (RO) type or conditional-exclusive (CEX) type.

5. The computer-implemented method of claim 4, wherein the directory state is stored in a cache state directory, wherein the detecting that the second operation does not allow for exclusive data is based, at least in part, on detecting a non-intervention master (non-IM) state in the cache state directory.

6. The computer-implemented method of claim 5, wherein the two snooped operations comprise two local conditional-exclusive fetches arriving from the multiple chips on the broadcast scope.

7. The computer-implemented method of claim 6, wherein the central L4 shared cache controller is configured to reject ingating of the second snooped operation into the L4 pipeline if the indication signal is not received by the central L4 shared cache controller.

8. A computer program product for simultaneous, non-atomic request processing of snooped operations of a broadcast scope within a symmetric multiprocessor (SMP) system, the computer program product comprising a computer readable storage medium having program instructions embodied therewith, the program instructions executable by a system comprising one or more processors to cause the system to perform a method, the method comprising:

detecting, by a first controller of the SMP system, based on a set of coherency resolution conditions, whether there are coherency resolution problems between two snooped operations arriving from multiple chips on the broadcast scope requesting access to a data element; and in response to detecting, by the first controller, that coherency resolution problems will not result, transmitting, from the first controller to a second controller of the SMP system, an indication signal indicating that coherency resolution problems will not result from the two snooped operations;

wherein the second controller is configured to receive the indication signal and to allow ingating of a second operation of the two snooped operations into a central pipeline based, at least in part on, the received indication signal;

wherein the set of coherency resolution conditions includes: (a) detecting that the second operation of the two snooped operations is of a predetermined type, (b) detecting at time of snooping of the second operation that a directory state does not allow for exclusive data, and (c) detecting that the first controller has started committing to an update.

9. The computer program product of claim 8, wherein the first controller comprises a core fetch access register (CFAR) controller.

10. The computer program product of claim 8, wherein the second controller comprises a central level 4 (L4) shared cache controller, wherein the central pipeline comprises an L4 pipeline, wherein the central L4 shared cache controller is further configured to monitor the L4 pipeline.

11. The computer program product of claim 10, wherein the predetermined type comprises read-only (RO) type or conditional-exclusive (CEX) type.

12. The computer program product of claim 11, wherein the directory state is stored in a cache state directory, wherein the detecting that the second operation does not allow for exclusive data is based, at least in part, on detecting a non-intervention master (non-IM) state in the cache state directory.

13. The computer program product of claim 12, wherein the two snooped operations comprise two local conditional-exclusive fetches arriving from the multiple chips on the broadcast scope.

14. The computer program product of claim 13, wherein the central L4 shared cache controller is configured to reject ingating of the second snooped operation into the L4 pipeline if the indication signal is not received by the central L4 shared cache controller.

15. A system for simultaneous, non-atomic request processing of snooped operations of a broadcast scope within a symmetric multiprocessor (SMP) environment, the system comprising one or more processors configured to perform a method, the method comprising:

detecting, by a first controller of the SMP environment, based on a set of coherency resolution conditions, whether there are coherency resolution problems between two snooped operations arriving from multiple chips on the broadcast scope requesting access to a data element; and in response to detecting, by the first controller, that coherency resolution problems will not result, transmitting, from the first controller to a second controller of the SMP environment, an indication signal indicating that coherency resolution problems will not result from the two snooped operations;

wherein the second controller is configured to receive the indication signal and to allow ingating of a second operation of the two snooped operations into a central pipeline based, at least in part on, the received indication signal;

wherein the set of coherency resolution conditions includes: (a) detecting that the second operation of the two snooped operations is of a predetermined type, (b) detecting at time of snooping of the second operation that a directory state does not allow for exclusive data, and (c) detecting that the first controller has started committing to an update.

16. The system of claim 15, wherein the first controller comprises a core fetch access register (CFAR) controller.

17. The system of claim 15, wherein the second controller comprises a central level 4 (L4) shared cache controller, wherein the central pipeline comprises an L4 pipeline, wherein the central L4 shared cache controller is further configured to monitor the L4 pipeline.

18. The system of claim 17, wherein the predetermined type comprises read-only (RO) type or conditional-exclusive (CEX) type.

19. The system of claim 18, wherein the directory state is stored in a cache state directory, wherein the detecting that the second operation does not allow for exclusive data is based, at least in part, on detecting a non-intervention master (non-IM) state in the cache state directory.

20. The system of claim 19, wherein the two snooped operations comprise two local conditional-exclusive fetches arriving from the multiple chips on the broadcast scope, wherein the central L4 shared cache controller is configured to reject ingating of the second snooped operation into the L4 pipeline if the indication signal is not received by the central L4 shared cache controller.

* * * * *